United States Patent
Voets et al.

(10) Patent No.: US 11,584,847 B2
(45) Date of Patent: Feb. 21, 2023

(54) POLYPROPYLENE COMPOSITION FOR TAPES

(71) Applicant: SABIC GLOBAL TECHNOLOGIES B.V., Bergen op Zoom (NL)

(72) Inventors: Patrick Elisabeth Luc Voets, Geleen (NL); Henrica Norberta Alberta Maria Steenbakkers-Menting, Geleen (NL); Martin Alexander Zuideveld, Kelmis (NL); Akhlaq A. Moman, Riyadh (SA); Waltraud Voigtlander, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 31 days.

(21) Appl. No.: 16/956,196

(22) PCT Filed: Dec. 18, 2018

(86) PCT No.: PCT/EP2018/085526
§ 371 (c)(1),
(2) Date: Jun. 19, 2020

(87) PCT Pub. No.: WO2019/121701
PCT Pub. Date: Jun. 27, 2019

(65) Prior Publication Data
US 2021/0070970 A1 Mar. 11, 2021

(30) Foreign Application Priority Data
Dec. 22, 2017 (EP) .................................... 17210351

(51) Int. Cl.
C08L 23/12 (2006.01)
C08F 10/06 (2006.01)
C09J 7/24 (2018.01)
C08F 4/02 (2006.01)

(52) U.S. Cl.
CPC ............. *C08L 23/12* (2013.01); *C08F 4/022* (2013.01); *C08F 10/06* (2013.01); *C09J 7/241* (2018.01)

(58) Field of Classification Search
CPC .................................. C08L 23/12; C08F 10/06
See application file for complete search history.

(56) References Cited

U.S. PATENT DOCUMENTS

| 6,723,795 B1 | 4/2004 | Dupire et al. |
| 9,605,093 B2 | 3/2017 | Ishiwata et al. |
| 2016/0046737 A1 | 2/2016 | Miller Mcloughlin et al. |
| 2020/0332102 A1 | 10/2020 | Steenbakkers-Menting et al. |

FOREIGN PATENT DOCUMENTS

WO 2018059955 A1 4/2018

OTHER PUBLICATIONS

Stamhuis, "Mechanical Properties and Morphology of Polypropylene Composites. Talc-Filled, Elastomer-Modified Polypropylene," Polym. Comp., Jul. 1984, vol. 5, No. 3, pp. 202-207. (Year: 1984).*
Maddah, "Polypropylene as a Promising Plastic: A Review," Am. J. Polym. Sci. 2016, 6(1):1-11. (Year: 2016).*
Oliveira et al., "The Weldability of Polypropylene Strapping Tape," Polym. Eng. Sci., vol. 40, No. 9 (2000). (Year: 2000).*
Hensen et al.; "Chapter 9: Extrusion of Film Tapes"; Plastics Extrusion Technology; 1997; 26 Pages.
Hensen F. et al.; "Production of Polyolefin Tapes"; Fiber Production; Man-Made Fiber Year Book (CTI); 1993; pp. 45-48.
International Search Report for International Application No. PCT/EP2018/085526, International Filing Date Dec. 18, 2018, dated Feb. 15, 2019, 5 pages.
Philips, K.J. et al., "The Technology of Polypropylene Tape Yarns: Processing and Applications"; Textile Progress, 2003, vol. 33, pp. 1-53.
Written Opinion for International Application No. PCT/EP2018/085526, International Filing Date Dec. 18, 2018, dated Feb. 15, 2019, 4 pages.

* cited by examiner

*Primary Examiner* — Catherine S Branch
(74) *Attorney, Agent, or Firm* — Cantor Colburn LLP

(57) ABSTRACT

The invention relates to a polypropylene composition comprising a propylene homopolymer or propylene-ethylene copolymer having an ethylene content of at most 1.0 wt % based on the propylene-ethylene copolymer, wherein the amount of propylene homopolymer or propylene-ethylene copolymer is at least 98 wt %, for example at least 98.5 wt %, preferably at least 99 wt %, more preferably at least 99.5, for example at least 99.75 wt % based on the polypropylene composition, wherein the polypropylene composition has a melt flow rate in the range of 0.70 to 2.4 dg/min as measured according to IS01 133 (2.16 kg/230° C.), an Mw/Mn in the range from 7.0 to 13.0, wherein Mw stands for the weight average molecular weight and Mn stands for the number average weight, an Mz/Mn is in the range from 20 to 50, wherein Mz stands for the z-average molecular weight and wherein Mw, Mn and Mz are measured according to ASTM D6474-12.

15 Claims, No Drawings

POLYPROPYLENE COMPOSITION FOR TAPES

CROSS REFERENCE TO RELATED APPLICATIONS

This application is a National Stage application of PCT/EP2018/085526, filed Dec. 18, 2018, which claims the benefit of European Application No. 17210351.7, filed Dec. 22, 2017, both of which are incorporated by reference in their entirety herein.

The invention relates to a polypropylene composition comprising a propylene homopolymer or propylene-ethylene copolymer, an article comprising said polypropylene composition, preferably a tape or strapping as well as to a process for producing a tape or strapping from the polypropylene composition and to the use of the polypropylene composition for producing a tape, including strapping tape.

It is generally known that the industrially established tape products are currently made from polypropylene (PP) and polyethylene (PE); the three main applications being high modulus tapes, weaving tapes, baler twines and rope strands (see F. Hensen, Man-Made Fiber Year Book (CTI), 45-48, 1992). It is also commonly recognized that PP is the dominant synthetic polymer for uniaxially-oriented tapes from slit film; but high density polyethylene is also used. PP tape production has been established since the 1960s and occurs on a large scale world-wide. The article "Production of polyolef in tapes", F. Hensen, Man-Made Fiber Year Book (CTI), 45-48, 1992 reviews the technology for making uniaxially-oriented polypropylene and polyethylene tapes. The process for uniaxially oriented PP tapes comprises the steps of (1) extruding a film (or tape) into a water bath or a chill roller; (2) in case of a film, slitting the film into a plurality of tapes; (3) heating the tape(s) and stretching the tape(s) in an oven; (4) heat setting the tape(s) at a higher temperature and (5) winding each uniaxially-oriented tape on a bobbin.

A tape in general is understood to mean a ribbon of plastic film, whose thickness is very thin in relation to its length and width. In the polypropylene tape industry, the tape thickness is in the range of 0.02 to 0.10 mm (20 µm to 100 µm) and the width is from 1 to 60 mm [see for example K. J. Philips and T. K. Ghosh "The Technology of Polypropylene Tape Yarns: Processing and Applications", Textile Progress, Volume 33, (2003), pages 1-53]. That is, the tape has a high width-to-thickness ratio. Typically the width is between 5-100 times larger than the thickness. The length of the tape can be indefinite, as the ribbons are normally made with a continuous extrusion process. The most common is to have a well-controlled rectangular cross-section, which is desirable for uniform drawing behaviour; however, profiled sections (corrugated, ribbed etc.) are also known (see K. J. Philips and T. K. Ghosh "The Technology of Polypropylene Tape Yarns: Processing and Applications").

Specific tape dimensions are established in the polypropylene tape industry, see F. Hensen, Production of Polyolefin Tapes, CFI Man-made Fiber Year Book, 1992, pages 44-48; also, F. Hensen and Stausberg, chapter 9, "Extrusion of Film Tapes', pp 317, Plastics Extrusion Technology, Ed. F. Hensen, 2nd edition, Hanser, 1997.

Polypropylene based weaving tapes generally have thicknesses in the range of 30-80 µm and a width of 1-3 mm. Polypropylene based strapping tape is exceptionally thick (300-600 µm) and generally has a width of between 4 and 16 mm. A strapping tape is used to strap cartons and boxes.

In industry, there is a desire to down-gauge, in other words to use less material. However, such materials, even when used in smaller amounts (less thickness) should have similar mechanical properties. For tape applications, it is important that the stiffness is maintained when going to thinner tapes. In addition, a low gel count becomes more important for thinner tapes as defects in the tape will act as stress concentrations which may result in undesired early breakage of the tape.

A drawback of the currently available propylene homopolymers and propylene-ethylene copolymers for tapes, including strapping tapes are that the stiffness of the propylene homopolymers and propylene-ethylene copolymers does not allow to produce thinner tapes having sufficient stiffness. Furthermore, the currently available materials also have a too high gelcount, so that early breakage of the thinner tape occurs.

Therefore, it is an object of the invention to provide a polypropylene composition having a lower gel count (i.e. a decreased amount of gels) and a higher stiffness.

This object is achieved by a polypropylene composition comprising a propylene homopolymer or propylene-ethylene copolymer having an ethylene content of at most 1.0 wt % based on the propylene-ethylene copolymer wherein the amount of propylene homopolymer or propylene-ethylene copolymer is at least 98 wt %, for example at least 98.5 wt %, preferably at least 99 wt %, more preferably at least 99.5, for example at least 99.75 wt % based on the polypropylene composition wherein the polypropylene composition has a melt flow rate in the range of 0.70 to 2.4 dg/min as measured according to IS01133 (2.16 kg/230° C.)

an Mw/Mn in the range from 7.0 to 13.0, wherein Mw stands for the weight average molecular weight and Mn stands for the number average weight an Mz/Mn is in the range from 20 to 50, wherein Mz stands for the z-average molecular weight and wherein Mw, Mn and Mz are measured according to ASTM D6474-12.

It has been found that the polypropylene compositions of the invention show a lower gel count and have a higher stiffness, which allows for the preparation of thinner tapes without decreasing the properties of the tape. In addition, the processability of the polypropylene compositions in an extruder may be improved.

The polypropylene composition of the invention has a melt flow rate in the range of 0.70 to 2.4 dg/min, preferably a melt flow rate of at least 0.80 dg/min and/or of at most 2.3 dg/min, preferably at most 2.0 dg/min as measured according to IS01133 (2.16 kg/230° C.). Preferably, the polypropylene composition of the invention has a melt flow rate in the range of 0.70 to 2.3 dg/min as measured according to IS01133 (2.16 kg/230° C.).

The ethylene content in the propylene-ethylene copolymer is relatively low, i.e. at most 1.0 wt % based on the propylene-ethylene copolymer. For example the ethylene content is at least 0.1 wt %, for example at least 0.2 wt %, for example at least 0.3 wt %, for example at least 0.4 wt %, for example at least 0.5 wt % and/or for example at most 1.0 wt %, for example at most 0.7 wt % based on the propylene-ethylene copolymer. By using a propylene-ethylene copolymer for the preparation of a tape instead of a propylene homopolymer, processability may be improved.

Within the framework of the invention, with propylene-ethylene copolymer is meant a random propylene-ethylene copolymer.

For a good processing behavior for the preparation of tapes, it is preferred that the polypropylene composition of the invention has an average molecular weight Mw of at least 400 kmol, preferably at least 450 kmol and/or preferably of at most 600 kmol.

In order to have an acceptable high speed processing behavior in extrusion, it is preferred that the polypropylene composition of the invention has a molecular weight distribution (MWD) of at least 7.0, for example at least 8.0, preferably at least 8.5, more preferably at least 9.0 and/or at most 13.0, for example at most 12.0, preferably at most 11.0, more preferably at most 10.0. Preferably, the polypropylene composition of the invention according to the invention has a molecular weight distribution in the range from 8.0 to 11.0, wherein MWD is calculated by dividing the weight average molecular weight (Mw) by the number average molecular weight (Mn) and wherein Mw and Mn are measured according to ASTM D6474-12.

The Mz/Mn is calculated by dividing the z-average molecular weight (Mz) by the number average molecular weight (Mn) and wherein Mz and Mn are measured according to ASTM D6474-12.

For example, the Mz/Mw, that is the z-average molecular weight divided by the Mw, that is the average molecular weight is in the range from 2.7 to 4.5.

The polypropylene composition has an XS in the range from 0.5 to 3.5 wt %, preferably in the range from 0.5 to 3.0 wt %, more preferably in the range from 0.1 to 2.5 wt % based on the polypropylene composition. XS stands for the amount of xylene solubles which are measured according to ASTM D 5492-10.

It is preferred that the polypropylene composition has a pentad isotacticity of at least 94%, preferably of at least 94.5% and preferably of at most 98% based on the polypropylene composition, wherein the pentad isotacticity is determined using $^{13}C$ NMR.

The polypropylene composition of the invention preferably has a MWD divided by the gelcount 500 of at least 0.9, preferably having an MWD divided by the gelcount 500 of at least 1.0, preferably at least 3.0, preferably at least 5.0.

The MWD is the molecular weight distribution which is calculated by dividing the weight average molecular weight (Mw) by the number average molecular weight (Mn) and wherein Mw and Mn are measured according to ASTM D6474-12.

The gelcount 500 stands for the gelcount of all particles having an equivalent diameter of at least 500 µm as determined according to method as described herein. The gelcount 500 is preferably less than 13.

Gels are to be understood to be distinct polymeric domains in the polymer material that do not show thermoplastic properties, for example wherein individual polymer molecules are chemically bound to each other as a result of crosslinking, or for example wherein polymer molecules of a high molecular weight form physical bonds which are not reversible by exposing the material to a heat processing step such as is the case in thermoplastic processing, for example by forming entanglements and/or dense crystalline domains.

The gel content may for example be determined via on-line measurement of a film produced in the cast film system using an FSA-100 optical film surface analyser equipped with software version 6.3.4.2 obtainable from Optical Control Systems GmbH, in which the surface analyser is positioned between the chill roll system and the nip rolls. The film surface analyser may comprise a CCD line scan camera with a resolution of 50 µm, enabling the identification of gels having a dimension of at least 50 length and 50 µm width. The film surface analyser may comprise a halogen based illumination system. A continuous image of the film surface may be produced. The determination of gels may be performed using image recognition software provided by Optical Control Systems GmbH integrated with the FSA-100 film surface analyser. A film sample with a total surface size of 5.0 $m^2$ may be tested, for example a film with a total surface size of 10.0 $m^2$. The film thickness may be 10-60 µm, such as 25 µm.

The equivalent diameter of a gel is to be understood to be the average of the length and the width of the surface area of the gel as determined via on-line measurement as described herein. For example, the equivalent diameter may be the average of the largest diameter of a gel and the largest diameter of said gel in a direction perpendicular direction to said largest diameter of said gel.

Preferably, the polypropylene composition of the invention is unimodal. Unimodality of the polypropylene composition may further improve the processing of the polypropylene composition and/or may further decrease the gelcount.

It is herein understood that the term 'unimodal' means a polypropylene composition which is unimodal with respect to molecular weight distribution, whereby preferably the propylene homopolymer or propylene-ethylene copolymer can be polymerised in a single stage batch or preferably a single reactor in a continuous process. The polymerization can be a slurry or gas phase, preferably a gas phase polymerization.

The polypropylene composition of the invention may further comprise additives. Preferably, the propylene composition of the invention does not comprise polymers other than the propylene homopolymer or the propylene-ethylene copolymer. Preferably, the sum of the amount of additives and the amount of propylene homopolymer or propylene-ethylene copolymer is 100 wt % based on the polypropylene composition.

Preferably, the polypropylene composition of the invention has a flexural modulus in parallel orientation of at least 1800 MPa, preferably at least 1850 MPa, more preferably at least 1900 MPa as measured according to ASTM D790-10.

Preferably, the polypropylene composition of the invention has an Izod notched impact strength in parallel orientation of at least 2.5, preferably at least 3.0 $kJ/m^2$ as measured at 23° C. according to ISO 180 4A, Test geometry: 65*12.7*3.2 mm, notch 45° according to ISO 37/2 parallel orientation.

In another aspect, the invention relates to tapes, including strapping tapes prepared from the polypropylene composition of the invention.

In another aspect, the invention relates to the use of the polypropylene composition of the invention for the preparation of tapes, including strapping tapes.

In another aspect, the invention relates to a process for the preparation of the tapes of the invention, comprising the step of providing the polypropylene composition of the invention.

Such process may further comprise the sequential steps of
    extruding the polypropylene composition of the invention into a film (or tape) using a water bath or a chill roller;
    optionally slitting the film into a plurality of tapes
    heating the tape(s) and stretching the tape(s) and
    heat setting the tape(s) at a temperature higher than the previous step to obtain the tape The person skilled in the art is aware how to prepare a propylene homopolymer or propylene-ethylene copolymer. The preparation of propylene homopolymers and propylene-ethylene copolymers is for example described in Moore, E. P. (1996) Polypropylene Handbook. Polymerization, Characterization, Properties, Processing, Applications, Hanser Publishers: New York.

Polypropylene homopolymers and propylene-ethylene copolymers can be made by any known polymerization technique as well as with any known polymerization catalyst system. Regarding the techniques, reference can be given to slurry, solution or gas phase polymerizations; regarding the catalyst system reference can be given to Ziegler-Natta, metallocene or single-site catalyst systems. All are, in themselves, known in the art.

In another aspect, the invention relates to a process for the preparation of the polypropylene composition of the invention, comprising the step of polymerizing propylene and optional ethylene comonomers in the presence of a catalyst to obtain the propylene homopolymer or the propylene-ethylene copolymer, wherein said catalyst is obtainable by a process comprising the steps of A) providing a Ziegler-Natta procatalyst, wherein step (A) of providing the Ziegler-Natta procatalyst comprises the steps of contacting a magnesium-containing support with
  i) a halogen-containing titanium compound,
  ii) ethylbenzoate as an activator,
  iii) and as internal donor an aminobenzoate compound according to formula B:

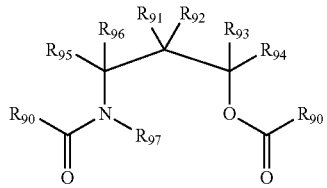

wherein each $R^{90}$ group is independently a substituted or unsubstituted aromatic group; $R^{91}$, $R^{92}$, $R^{93}$, $R^{94}$, $R^{95}$, and $R^{96}$ are each independently selected from a hydrogen or a linear, branched or cyclic hydrocarbyl group, selected from alkyl, alkenyl, aryl, aralkyl, or alkylaryl groups, and one or more combinations thereof, preferably having from 1 to 20 carbon atoms; $R^{97}$ is a hydrogen or a linear, branched or cyclic hydrocarbyl group, selected from alkyl, alkenyl, aryl, aralkyl, alkoxycarbonyl or alkylaryl groups, and one or more combinations thereof, preferably having from 1 to 20 carbon atoms; N is a nitrogen atom; O is an oxygen atom; and C is a carbon atom; preferably 4-[benzoyl(methyl)amino]pentan-2-yl benzoate (AB); and B) contacting said Ziegler-Natta procatalyst obtained in step A) with a co-catalyst and at least one external electron donor to obtain said catalyst;

preferably wherein step A) to provide the Ziegler-Natta procatalyst comprises the following steps:
  i) contacting a compound $R^4_z MgX^4_{2-z}$ with an alkoxy- or aryloxy-containing silane compound to give a first intermediate reaction product, being a solid $Mg(OR^1)_x X^1_{2-x}$, wherein: $R^4$ and $R^1$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms; $X^4$ and $X^1$ are each independently selected from the group of consisting of fluoride (F—), chloride (Cl—), bromide (Br—) or iodide (I—), preferably chloride; z is in a range of larger than 0 and smaller than 2, being 0<z<2, x is in a range of larger than 0 and smaller than 2, being 0<x<2;
  ii) optionally contacting the solid $Mg(OR^1)_x X^1_{2-x}$ obtained in step ii) with at least one activating compound selected from the group formed of activating electron donors and metal alkoxide compounds of formula $M^1(OR^2)_{v-w}(OR^3)_w$ or $M^2(OR^2)_{v-w}(R^3)_w$, to obtain a second intermediate product; wherein $M^1$ is a metal selected from the group consisting of Ti, Zr, Hf, Al or Si; $M^2$ is a metal being Si; v is the valency of $M^1$ or $M^2$ and is either 3 or 4; w<v; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has from 1 to 20 carbon atoms;
  iii) contacting the first or second intermediate reaction product, obtained respectively in step i) or ii), with the halogen-containing Ti-compound; the activator; and the internal electron donor to obtain said Ziegler-Natta procatalyst;

Preferably in said process, as external donor in step B) a phthalate free donor, for example di(isopropyl) dimethoxysilane, is used.

A more detailed description of the most preferred catalyst can be found in the patent application with application number PCT/EP2017/073148 as filed on 14 Sep. 2017 at the World Intellectual Property Office, which patent application is hereby incorporated by reference.

In case a phthalate-free catalyst, such as the above described catalyst using a phthalate free external donor, is used, the polypropylene composition of the invention is essentially phthalate-free. This is advantageous as more and more consumers try to avoid any contact with phthalates.

Therefore, preferably, the polypropylene composition of the invention as well as any articles comprising such polypropylene composition, such as the tapes of the invention are essentially phthalate-free.

For purposes of the invention, essentially phthalate-free is defined as the presence of less than 0.0001 wt % of phthalates based on the polypropylene composition, preferably 0.00000 wt % of phthalates based on the polypropylene composition.

In another aspect, the invention relates to a polypropylene composition obtained or obtainable by the process of the invention.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXAMPLES

Example 1

Step A) Butyl Grignard Formation

A 1.7 L stirred flask, fitted with a reflux condenser and a funnel, was filled with magnesium powder (40.0 g, 1.65 mol). The flask was brought under nitrogen. The magnesium was dried at 80° C. for 2 hours under nitrogen purge, after which dibutyl ether (200 ml), iodine (0.05 g) and n-chlorobutane (10 ml) were successively added and stirred at 120 rpm. The temperature was maintained at 80° C. and a mixture of n-chlorobutane (146 ml) and dibutyl ether (1180 ml) was slowly added over 3 hours. The reaction mixture was stirred for another 3 hours at 80° C. Then the stirring and heating were stopped and the small amount of solid material was allowed to settle for 24 hours. By decanting the colourless solution above the precipitate, a solution of butylmagnesiumchloride with a concentration of 0.90 mol Mg/L was obtained.

Step B) Preparation of the First Intermediate Reaction Product

The solution of reaction product of step A (500 ml, 0.45 mol Mg) and 260 ml of a solution of tetraethoxysilane (TES) in dibutyl ether (DBE), (47 ml of TES and 213 ml of DBE), were cooled to 5° C., and then were fed simultaneously to a mixing device (minimixer) of 0.45 ml volume equipped with a stirrer and jacket. The minimixer was cooled to 5° C. by means of cold water circulating in the minimixer's jacket. The stirring speed in the minimixer was 1000 rpm. From the mixing device, the mixed components were directly dosed into a 1.3 liter reactor fitted with blade stirrer and containing 350 ml of dibutyl ether. The dosing temperature of the reactor was 35° C. and the dosing time was 360 min. The stirring speed in the reactor was 250 rpm at the beginning of dosing and was gradually increased up to 450 rpm at the end of dosing stage. On completion of the dosing, the reaction mixture was heated up to 60° C. in 30 minutes and held at this temperature for 1 hour. Then the stirring was stopped and the solid substance was allowed to settle. The supernatant was removed by decanting. The solid substance was washed three times using with 700 ml of heptane at a reactor temperature of 50° C. for three times. A pale yellow solid substance, reaction product B (the solid first intermediate reaction product; the support), was obtained upon drying with a nitrogen purge. The average particle size of support was 20 microns.

Step C) Preparation of the Second Intermediate Reaction Product

In inert nitrogen atmosphere at 20° C. in a 1000 ml glass flask equipped with a mechanical agitator was filled with 50 g of reaction product B, dispersed in 500 ml of heptane and stirred at 250 rpm. Subsequently, a solution of 2.7 ml ethanol (EtOH/Mg=0.1) in 20 ml heptane was dosed under stirring during 1 hour. After keeping the reaction mixture at 20° C. for 30 minutes, a solution of 9.5 ml titanium tetraethoxide (TET/Mg=0.1) in 20 ml of heptane was added for 1 hour. The slurry was slowly allowed to warm up to 30° C. over 30 minutes and held at that temperature for another 2 hours. Finally, the supernatant liquid was decanted from the solid reaction product (the second intermediate reaction product C; first activated support) which was washed once with 500 ml of heptane at 30° C. and dried using a nitrogen purge.

Step D) Preparation of the Third Intermediate Reaction Product

In inert nitrogen atmosphere at 25° C. in a 1000 ml glass flask equipped with a mechanical agitator was filled with 50 g of second intermediate reaction product C dispersed in 500 ml of heptane and stirred at 250 rpm. Subsequently, a solution of 6.3 ml ethanol (EtOH/Mg=0.3), 20.8 ml of toluene and 37.5 ml of heptane was dosed at 25° C. under stirring during 1 hour. The slurry was slowly allowed to warm up to 30° C. over 30 minutes and held at that temperature for another 3 hours. Finally, the supernatant liquid was decanted from the solid reaction product (the third intermediate reaction product D; second activated support) which was washed once with 500 ml of heptane at 25° C. and dried using a nitrogen purge.

Preparation of the Catalyst H

Steps A-D) are carried out as in Example 1. Step E) is carried out as follows.

A 300 ml reactor-filter flask was brought under nitrogen and 125 mL of titanium tetrachloride was added, then 5.5 g of second activated support in 15 ml of heptane was added to the reactor. The contents of the reactor were stirred for 60 minutes at room 25° C. Then, 1.78 ml of ethylbenzoate, EB (EB/Mg=0.30 molar ratio) in 4 ml of chlorobenzene was added to the reactor in 30 minutes. Temperature of reaction mixture was increased to 115° C. and then the reaction mixture was stirred at 115° C. for 90 minutes (I stage of catalyst preparation). The contents of the flask were filtered, after which the solid product was washed with chlorobenzene (125 ml) at 100 to 105° C. for 20 minutes. Then, the contents of the flask were filtered. A mixture of titanium tetrachloride (62.5 ml) and chlorobenzene (62.5 ml) was added to the reactor. The reaction mixture was stirred at 115° C. for 60 minutes (II stage of catalyst preparation). Then, the contents of the flask were filtered. A mixture of titanium tetrachloride (62.5 ml) and chlorobenzene (62.5 ml) was added to the reactor. Then, 0.51 g of 4-[benzoyl(methyl) amino]pentan-yl benzoate (AB/Mg=0.04) in 4 ml of chlorobenzene was added to the reactor in 10 minutes. The reaction mixture was stirred at 115° C. for 30 minutes (III stage of catalyst preparation). Then, the contents of the flask were filtered. A mixture of titanium tetrachloride (62.5 ml) and chlorobenzene (62.5 ml) was added to the reactor. The reaction mixture was stirred at 115° C. for 30 minutes (IV stage of catalyst preparation). Then, the contents of the flask were filtered. The solid product obtained was washed five times with 125 ml of heptane starting at 60° C. with 5 minutes stirring per wash prior to filtration. The temperature was gradually reduced from 60 to 25° C. during the washings. Finally, the solid product obtained was dried using a nitrogen purge at a temperature of 25° C. for 2 hours. The composition of the solid catalyst H produced is given in Table 1.

TABLE 1

Composition of solid catalyst H

| Catalyst | Example | d50 [µm] | Mg [%] | Ti [%] | ID [%] | Activator (EB) [%] | EtO [%] |
|---|---|---|---|---|---|---|---|
| H | 8 | 22.16 | 19.65 | 2.40 | 8.41 | 6.68 | 1.48 |

Catalyst CE

Catalyst CE is prepared according to the method disclosed in U.S. Pat. No. 4,866,022, hereby incorporated by reference. This patent discloses a catalyst component comprising a product obtained by: (a) forming a solution of a magnesium-containing species from a magnesium carbonate or a magnesium carboxylate; (b) precipitating solid particles from such magnesium-containing solution by treatment with a transition metal halide and an organosilane having a formula: $R_nSiR'_{4-n}$, wherein n=0 to 4 and wherein R is hydrogen or an alkyl, a haloalkyl or aryl radical containing one to about ten carbon atoms or a halosilyl radical or haloalkylsilyl radical containing one to about eight carbon atoms, and R' is OR or a halogen; (c) reprecipitating such solid particles from a mixture containing a cyclic ether; and (d) treating the reprecipitated particles with a transition metal compound and an electron donor. This process for preparing a catalyst is incorporated into the present application by reference.

The process was performed in one horizontally stirred gas-phase reactor with downstream powder processing units (=degassing & catalyst deactivation) for powder collection.

The reactor was operated at an average of 70° C. at 25 bar. H2/C3 ratios in both reactors were controlled such to obtain a powder having the desired melt flow rate (MFR).

The catalyst was dosed through a nozzle to the reactor. Cocatalyst (triethylaluminium, TEN) and External Donor (DIPDMS or DiBDMS) were dosed via a separate nozzle to the reactor (as a premixed mixture) and in ratio to the catalyst flow.

The process conditions as given in Table 2 were used:

TABLE 2

Process conditions.

| | catalyst | donor | Al/Mg (mol/mol) | Al/Si (mol/mol) | Si/Ti (mol/mol) | $H_2/C_3$ (mol/mol) |
|---|---|---|---|---|---|---|
| Example 1 | H | DiPDMS | 4 | 7 | 8 | 0.009 |
| Comparative example 1 (CE1) | CE | DiBDMS | 4 | 12 | 5 | 0.0008 |

DiPDMS: di-(isopropyl)-dimethoxysilane
DiBDMS: di(isobutyl)-dimethoxysilane

The powder was collected and granulate was prepared by melt-mixing the powder with the appropriate additives in a single screw extruder. The additives (antioxidants, acid scavengers) were used in an amount of 1400 ppm based on the powder and mixed prior to dosing to the extruder. The temperature profile in the extruder was 20-20-30-50-100-170-220-220-240° C., at a throughput of 13 kg/h at 200 rpm.

Methods

All of the below properties were measured on the granulate.

Mz, Mn, Mw

Mw, Mn and Mz were all measured in accordance with ASTM D6474-12 (Standard Test Method for Determining Molecular Weight Distribution and Molecular Weight Averages of Polyolefins by High Temperature Gel Permeation Chromatography). Mw stands for the weight average molecular weight and Mn stands for the number average weight. Mz stands for the z-average molecular weight.

In addition to the method specified by ASTM D6474-12, the method was performed using a configuration in which a Polymer Char IR5 infrared concentration detector and a Polymer Char online viscosity detector was used to gain 'absolute' or accurate molar masses. Three columns of Polymer Laboratories 13 µm PLgel Olexis, 300×7.5 mm were used in series with 1,2,4-trichlorobenzene stabilized with 1 g/L butylhydroxytoluene (also known as 2,6-di-tert-butyl-4-methylphenol or BHT) as eluens. The molar mass was determined based on a calibration using linear PE standards (narrow and broad (Mw/Mn=4 to 15)) in the range of 0.5-2800 kg/mol. Samples of polymer granules were mixed with Tris (2,4-di-tert-butylphenyl)phosphite (Irgafos 168) and 1,1,3-Tris (2-methyl-4-hydroxy-5-tert-butylphenyl)butane (Topanol CA) in a weight ratio sample:Irgafos:Topanol of 1:1:1, after which the mixture thus obtained was dissolved in 1,2,4-trichlorobenzene stabilized with 1 g/L BHT until the concentration of the mixture in 1,2,3-trichlorobenzene stabilized with 1 g/L BHT was 0.03 wt %.

Xylene Solubles (XS)

XS, wt % is xylene solubles, measured according to ASTM D 5492-10. 1 gram of polymer and 100 ml of xylene are introduced in a glass flask equipped with a magnetic stirrer. The temperature is raised up to the boiling point of the solvent. The so obtained clear solution is then kept under reflux and stirring for further 15 min. Heating is stopped and the isolating plate between heating and flask is removed. Cooling takes places with stirring for 5 min. The closed flask is then kept for 30 min in a thermostatic water bath at 25° C. for 30 min. The so formed solid is filtered on filtering paper. 25 ml of the filtered liquid is poured in a previously weighed aluminium container, which is heated in a stove of 140° C. for at least 2 hours, under nitrogen flow and vacuum, to remove the solvent by evaporation. The container is then kept in an oven at 140° C. under vacuum until constant weight is obtained. The weight percentage of polymer soluble in xylene at room temperature is then calculated.

Pentad Isotacticity 175 mg of the polypropylene granules was dissolved in 3 ml at 130° C. in deuterated tetrachloroethylene ($C_2D_2Cl_4$) containing 2,6-Di-tert-butyl-4-methylphenol (BHT) (5 mg BHT in 200 ml $C_2D_2Cl_4$). The $^{13}C$ NMR spectrum was recorded on a Bruker Avance 500 spectrometer equipped with a cryogenically cooled probe head operating at 125° C. The isotacticity of the mmmm pentad levels was determined from the $^{13}C$ NMR spectrum in % based on the total pentad amount.

Melt Flow Rate (MFR)

For purpose of the invention the melt flow rate is the melt flow rate as measured according to ISO1133 (2.16 kg/230° C.).

Tm and Tc Measurement

The crystallization temperature, the crystallinity and the melting temperature are measured according to ASTM D3418-08 at a heating rate of 10° C./min in DSC. The sample is heated up to 200° C. (first heating) and then cooled at a cooling rate 10° C./min of (to measure the crystallization temperature Tc) and then heated a second time at a heating rate of 10° C./min (second heating) to measure the melting temperature (Tm). For the determination of Tc and Tm, a 5 mg polymer sample was measured.

Production of Films

The granulate obtained was processed into single-layer films having a thickness of 25 μm by using a ME-20 extruder and a CR-7 cast film system obtainable from Optical Control Systems GmbH. The extruder was operated at a screw speed of 50 rpm, with a temperature profile along the extruder screw of 190° C. in the material feed zone to 250° C. in the die zone. The extruder was equipped with a slit die. The width of the die opening was 100 mm. The die gap was in the range from 0.50 to 1.0 mm.

The cast film system comprised a dual chrome plated steel chill roll system having a temperature control system. The chill roll was operated at a temperature of 20° C. The cast film system comprised two rubber nip rolls to pull the film. The speed of the cast film system was controlled by the nip rolls to produce film at a speed of 7.6 m/min.

Gel Content Determination

The gel content was determined via on-line measurement of the film in the cast film system using an FSA-100 film surface analyser obtainable from Optical Control Systems GmbH software version 6.3.4.2, wherein the surface analyser is positioned between the chill roll system and the nip rolls. The film surface analyser comprised a CCD line scan camera with a resolution of 50 μm. The smallest defects that could be identified accordingly had a dimension of 50 μm length and 50 μm width. The film surface analyser comprised halogen based illumination system. A continuous image of the film surface was thus produced. The determination of defects was performed using image recognition software provided by Optical Control Systems GmbH integrated with the FSA-100 film surface analyser. A film sample with a total surface size of 10.0 m² was tested.

The number of gels having an equivalent diameter of >100 μm, >200 μm and of >500 μm and of >900 μm were reported.

Flex. Modulus (parallel orientation).

For purpose of the present invention, stiffness of the granulate is determined by measuring the flexural modulus according to ASTM D790-10. Flexural modulus was determined on 3.2 mm thick specimens according to ISO37/2, parallel orientation.

Izod Notched Impact Strength (Parallel Orientation)

For purpose of the present invention, impact strength is determined by measuring the Izod notched impact strength of the granulate at 23° C. according to ISO 180 4A, Test geometry: 65*12.7*3.2 mm, notch 45° according to ISO 37/2 parallel orientation.

Conclusion

As can be seen from Table 3, the polypropylene compositions of the invention show a lower gel count and have a higher stiffness and maintain their impact strength, which allows for the preparation of thinner tapes without decreasing the properties of the tape.

In particular, when a phthalate free external donor is used, the polypropylene composition of the invention could be suitably used for applications where consumer acceptance of phthalate containing products is low, for example in food and medical applications.

TABLE 3

Results

| Example | IE1 | CE1 |
|---|---|---|
| Mw (kDa) | 460 | 440 |
| Mn (kDa) | 48 | 75 |
| Mz (kDa) | 1400 | 1100 |
| Mz/Mw | 3.1 | 2.6 |
| Mz/Mn | 29.2 | 14.7 |
| MWD = Mw/Mn | 9.6 | 5.9 |
| XS (wt %) | 2.1 | 2.3 |
| Pentad isotacticity (%) | 96.0 | 94.1 |
| Tm (2$^{nd}$ heating), (° C.) | 163.3 | 162.0 |
| Tc (2$^{nd}$ cooling), ° C. | 111.8 | 111.7 |
| MFR (g/10 min) | 1.3 | 1.0 |
| properties | | |
| Gel count >200 μm | 2.10 | 49 |
| Gel count >500 μm | 0.3 | 7.8 |
| Gel count >900 μm | 0.2 | 2.1 |
| MWD/gelcount >500 μm | 32 | 0.76 |
| Cumulative gel count is gel county >100 μm | 49.7 | 170.2 |
| flex modulus (parallel orientation) (MPa) | 1934 | 1742 |
| Izod notched Impact strength (parallel orientation) (kJ/m²) | 3.2 | 3.4 |

The invention claimed is:

1. A tape prepared from a polypropylene composition comprising a propylene homopolymer or propylene-ethylene copolymer having an ethylene content of at most 1.0 wt % based on the propylene-ethylene copolymer,
wherein an amount of propylene homopolymer or propylene-ethylene copolymer is at least 98 wt %, based on the polypropylene composition,
wherein the polypropylene composition has
a melt flow rate in the range of 0.70 to 2.4 dg/min as measured according to ISO1133 (2.16 kg/230° C.);
an Mw/Mn in the range from 8.0 to 13.0, wherein Mw stands for the weight average molecular weight and Mn stands for the number average weight; and
an Mz/Mn is in the range from 20 to 50, wherein Mz stands for the z-average molecular weight, and
wherein Mw, Mn and Mz are measured according to ASTM D6474-12.

2. A process for the preparation of the tapes of claim 1 comprising the step of providing the polypropylene composition; and extruding the polypropylene composition.

3. The tape according to claim 1, wherein the tape is a strapping tape.

4. The tape according to claim 1, wherein the polypropylene composition has a melt flow rate in the range of 0.70 to 2.3 dg/min as measured according to ISO1133 (2.16 kg/230° C.).

5. The tape according to claim 1, wherein the polypropylene composition has an amount of xylene soluble amount (XS) as measured according to ASTM D 5492-10 in the range from 0.5 to 3.5 wt %.

6. The tape according to claim 1, wherein the polypropylene composition has a pentad isotacticity of at least 94% based on the composition, wherein the isotacticity is determined using $^{13}$C NMR.

7. The tape according to claim 1, wherein the polypropylene composition has a MWD divided by the gelcount 500 of at least 0.9 wherein MWD is calculated by dividing the weight average molecular weight (Mw) by the number average molecular weight (Mn) and wherein Mw and Mn are measured according to ASTM D6474-12 and wherein the gelcount 500 stands for the gelcount of all particles having an equivalent diameter of at least 500 μm.

8. The tape according to claim 1, wherein the polypropylene composition is unimodal.

9. The tape according to claim 1, wherein the polypropylene composition further comprises additives, and wherein sum of the amount of additives and the amount of propylene homopolymer or propylene-ethylene copolymer is 100 wt % based on the polypropylene composition.

10. The tape according to claim 1, wherein the polypropylene composition has a flexural modulus in parallel orientation of at least 1800 MPa, as measured according to ASTM D790-10.

11. The tape according to claim 1, wherein the polypropylene composition has an Izod notched impact strength in parallel orientation of at least 2.5 kJ/m$^2$ as measured at 23° C. according to ISO 180 4A.

12. The tape according to claim 1, wherein the polypropylene composition has an Mz/Mw is in the range from 2.7 to 4.5.

13. The tape according to claim 1, wherein the amount of propylene homopolymer or propylene-ethylene copolymer is at least 99.75 wt %, based on the polypropylene composition.

14. The tape according to claim 13, wherein the tape has a thickness of 20 microns to 100 microns.

15. The tape according to claim 1, wherein the polypropylene composition has an Mw/Mn in the range from 9.0 to 13.0.

* * * * *